Aug. 28, 1962   N. K. STENBERG   3,051,195
FLOW CONTROL DEVICE
Filed May 11, 1959   2 Sheets-Sheet 1

INVENTOR.
NYYRIKKI K. STENBERG
BY
*Busse Smith & Harding*
ATTORNEYS

INVENTOR.
NYYRIKKI K. STENBERG

United States Patent Office 3,051,195
Patented Aug. 28, 1962

3,051,195
FLOW CONTROL DEVICE
Nyyrikki K. Stenberg, Roslyn, Pa., assignor to Fischer & Porter Company, Hatboro, Pa., a corporation of Pennsylvania
Filed May 11, 1959, Ser. No. 812,259
9 Claims. (Cl. 137—501)

This invention relates to a device for introducing a flow of liquid into a fluid stream in a controlled manner. It is of particular value for metering a small flow of liquid into a relatively large stream of fluid.

The device of this invention has a wide application in view of its simplicity of construction combined with accuracy of flow control. By way of example, typical applications are the introduction of sodium hypochlorite into the water supply line of a swimming pool and the metering of sodium chromate used as a corrosion preventative in air conditioning systems.

The invention and its objects will be made clear from a reading of the following description in conjunction with the drawings in which.

Figure 2:
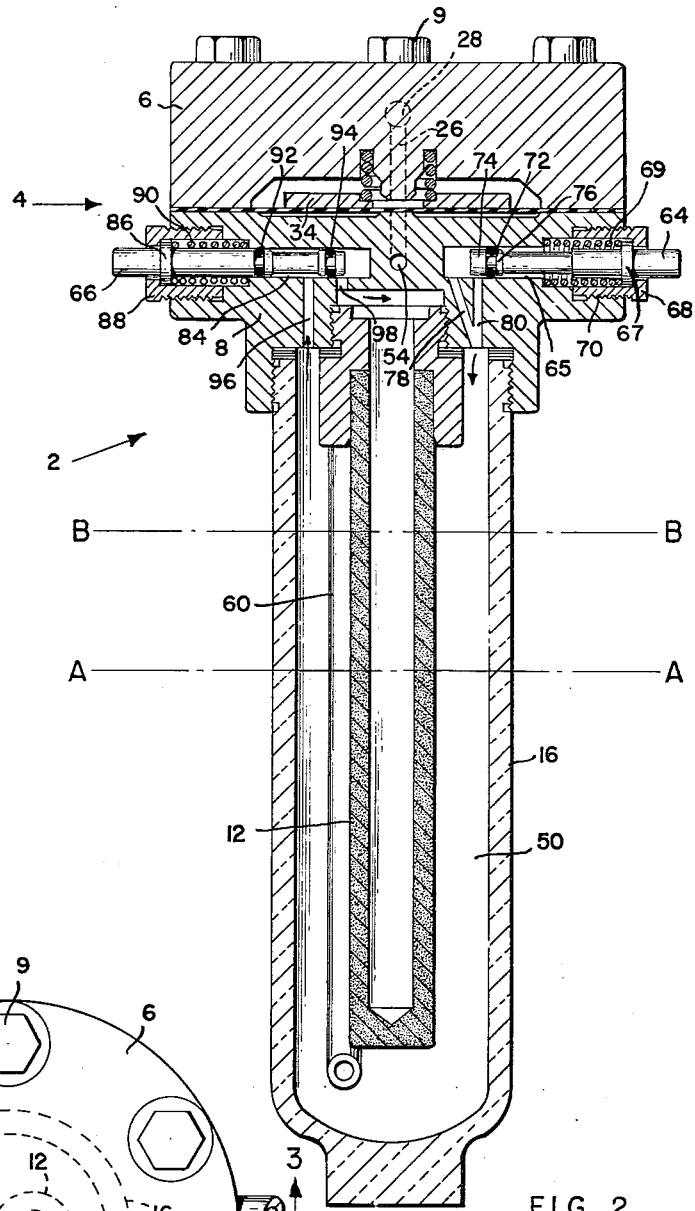
FIGURE 2 is a section on the broken surface indicated by the line 2—2 of FIGURE 1.
Figure 1:
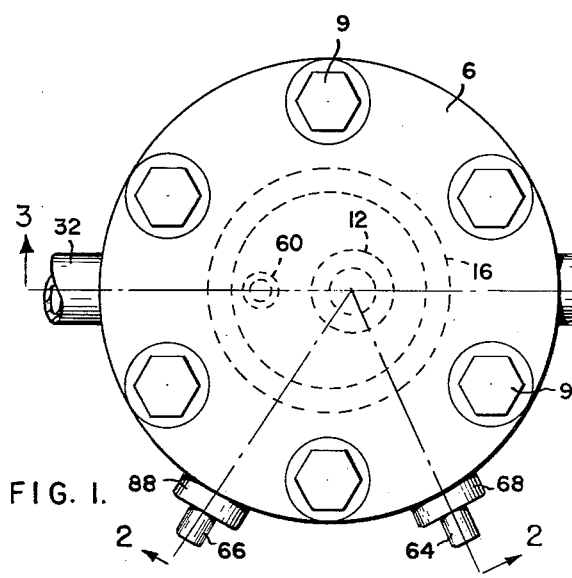
FIGURE 1 is a plan view of a device in accordance with this invention.

As shown in the figures, a flow control device 2, in accordance with this invention, has a body 4 comprising an upper member 6 and a lower member 8, which are secured together by machine screws indicated at 9. A hollow threaded member 10 is threadably secured to member 8 and carries a diffuser 12 which is a permeable body having capillary pores. Diffuser 12 is secured to member 10 by a pressed fit. Diffuser 12 may be any liquid permeable material having pores capillary in nature and being suitably resistant to corrosion by the fluids employed, for example, porous ceramic ware, such as of unglazed porcelain, aluminum oxide, silicon dioxide, other porous stones and carborundum. A tight seal between members 8 and 10 is made by a gasket 14.

A casing member 16 surrounding a portion of diffuser 12 and member 10 is threadably secured to the lower end of member 8 at 17. A gasket 18 is interposed between casing member 16 and member 8.

The interior of diffuser 12 communicates with passage 19 in member 8. Passage 19 is plugged as indicated at 20. Passage 19 in turn communicates with passage 22 in member 6 which in turn communicates with chamber 24. Chamber 24 is connected by a suction passage 26 of an ejector 28. Fluid is supplied to ejector 28 by a supply line indicated at 30 and discharges into a line indicated at 32.

A backing member 34 in chamber 24 is biased downwardly by a compression coil spring 40 and abuts against a diaphragm 42 which is clamped between members 6 and 8 of body 4. Member 34 has a central opening 36 exposing the portion of diaphragm 42 adjacent a seat 38 to permit cooperation of this portion of diaphragm 42 with seat 38. Diaphragm 42 is cooperable with the seat 38 in response to the vacuum in chamber 24 which is provided by the suction effect of ejector 28 to control flow through passage 26. Diaphragm 42 is provided with an opening 44 to permit the flow of fluid between passages 19 and 22. On the opposite side of diaphragm 42 from chamber 24, there is provided a chamber 46. It will be appreciated that member 34, seat 38, spring 40, diaphragm 42, chamber 24 and chamber 46 form a conventional differential pressure regulator.

Casing member 16 forms a reservoir for fluid 50 which surrounds a portion of permeable member 12. Fluid 50 is supplied by a supply line 52 which, as is shown schematically, is connected by a line 54 to fluid 50 in jug 56, line 54 passing freely through the open top of jug 56. Line 52 discharges into passage 57 in member 8 which, in turn, discharges into chamber 46. Member 8 is provided with a boss 58 on which diaphragm 42 seats when ejector 28 is not operating to produce a vacuum. Diaphragm 42 is biased toward contact with boss 58 by spring 40 acting through member 34. When diaphragm 42 is raised due to the vacuum produced by ejector 28, chamber 46 communicates with passage 59. A tube 60 is secured by a pressed fit in an enlarged portion 62 of passage 59 and ring gaskets are provided at 63. Tube 60 extends downwardly into the lower part of casing 16. Plug 61 separates passages 57 and 59.

For the control of the level of liquid 50 in casing 16 there are provided sleeve valves 64 and 66. Valve 64 functions to connect the upper portion of the interior of casing 16 to the atmosphere. Valve 64 is retained in opening 65 in member 8 by the engagement of enlarged portion 67 by member 68 which is threadably secured in opening 65. A compression coil spring 69 biases valve 64 to the closed position. An O ring 72 is secured in position by portions 74 and 76 of valve 64. O ring 72 acts to seal the wall of opening 65 where it engages it. Opening 65 is connected to the interior of casing 16 by passages 78 and 80 which come together at their lower ends.

Sleeve valve 66 is held in opening 84 in member 8 by the engagement of enlarged portion 86 by member 88 which is threadably secured in opening 84. Valve 66 is biased in the closed position by a compression coil spring 90. O rings 92 and 94 are secured to valve 66 and act to seal opening 84 where they engage its wall. Opening 84 is connected to the interior of casing 16 by passage 96 and is connected to passage 19 in member 8, by a passage 98.

*Operation*

Figure 3:
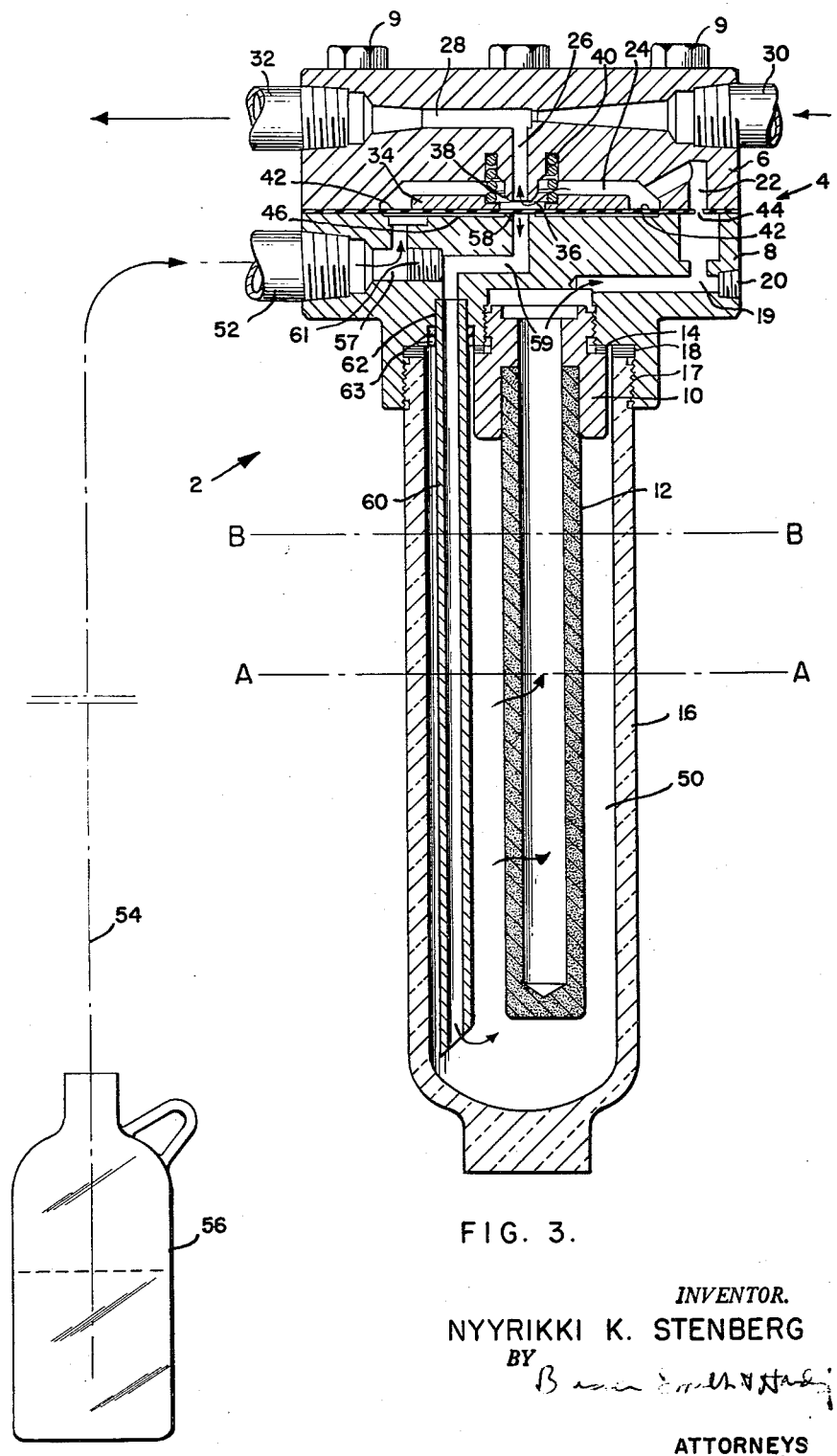
FIGURE 3 is a section on the broken surface indicated by the line 3—3 of FIGURE 1.

As shown in FIGURES 2 and 3, the device 2 has not yet been placed in operation. In order to place it in operation fluid, for example, water, is flowed through ejector 28 causing a vacuum which in turn results in the upward movement of diaphragm 42 against the downward biasing of spring 40. The throttling action of the differential pressure regulator is conventional and involves cooperation of diaphragm 42 with seat 38 to maintain a substantially constant pressure in chamber 24 to thereby establish the pressure drop through permeable member 12. The raising of diaphragm 42 causes fluid to flow incident to the vacuum created by the ejector from jug 56 through line 54, line 52, passage 57, chamber 46, passage 59 and tube 60 into the interior of casing 16. The diffuser 12 being dry the air within casing 16 will be exhausted until the liquid supplied from jug 56 has wetted the diffuser which it will do by capillary action. Once wetted the diffuser will remain in this condition in the saturated atmosphere. The wetted diffuser will prevent the passage of air. This permits the ready establishment of the liquid level in casing 16 and once established the level will remain unchanged.

Assuming that after the starting up operation the liquid level is too high and that it is desired to lower it to the level indicated by the line A—A, valve 64 is depressed until O ring 72 passes beyond passage 80, thus connecting the top of casing 16 to the atmosphere through passage 80 and opening 65, air being able to flow freely between all portions of valve 64 and members 8 and 68 except where O ring 72 engages member 8. This results in return flow by gravity of liquid 50 through tube 60, passage 59, chamber 57 and lines 52 and 54, into jug 56 until valve 64 is released, cutting off the connection to the atmosphere and establishing the liquid level at the line A—A where it will remain.

On the other hand, if it is now desired to raise the liquid level to the level indicated by the line B—B, valve 66 is depressed until passages 96 and 98 lie between O rings 92 and 94. This results in by-passing diffuser 12 and connecting the interior of casing 16 to the vacuum in passage 19. This will, of course, cause the level of liquid 50 to rise until it reaches the level of line B—B when valve 66 is released, cutting off the by-pass through passage 98 to the vacuum by O ring 94.

With the liquid level established at the desired point it will remain constant and for the selected level a constant flow of liquid 50 will pass through diffuser 12 into passage 19 through opening 44, passage 22, chamber 24, and passage 26, discharging at the desired rate into the stream of fluid passing through ejector 28. The rate of introduction of the fluid 50 into the stream passing through ejector 28 can thus be very accurately regulated simply by varying the liquid level in casing 50 and once the desired rate is established it will be maintained with accuracy.

When the flow of fluid through ejector 28 is stopped, undesirable back flow of fluid from the ejector through the device and into jug 56 is positively prevented by the cooperation of diaphragm 42 with boss 58 which functions as a valve seat. When the vacuum created by ejector 28 is eliminated by shut-down diaphragm 42 incident to the action of spring 40 on member 34 will be forced downwardly against boss 58 which will act to positively prevent back flow down into jug 56.

What is claimed is:

1. A device for introducing an additive liquid to a second liquid which comprises a reservoir adapted to contain said additive liquid, a permeable body with capillary pores having one side adapted to contact the additive liquid in said reservoir, said capillary pores being fillable with said additive liquid by capillary action to make said body gas impervious, the side of said permeable body opposite the side in contact with the additive liquid being in communication with the second liquid, means to vary the level of the additive liquid in the reservoir to control the rate of flow from the reservoir and means producing an excess pressure on the liquid on the reservoir side of the permeable body over the pressure on the liquid on the opposite side of the permeable body.

2. A device for introducing an additive liquid to a second liquid which comprises a reservoir adapted to contain said additive liquid, a permeable porcelain body with capillary pores having one side adapted to contact the additive liquid in said reservoir, said capillary pores being fillable with said additive liquid by capillary action to make said body gas impervious, the side of said porcelain body opposite the side in contact with the additive liquid being in communication with the second liquid, means to vary the level of the additive liquid in the reservoir and means producing an excess pressure on the liquid on the reservoir side of the porcelain body to be at a greater pressure than the liquid on the opposite side of the porcelain body.

3. A device for introducing an additive liquid to a second liquid which comprises a reservoir, an upstanding hollow permeable body with capillary pores in said reservoir, the interior of said body being in communication with said second liquid, said capillary pores being fillable with said additive liquid by capillary action to make said body gas impervious, means to regulate the level of additive liquid in the reservoir and means producing an excess pressure on the liquid on the reservoir side of the permeable body over the pressure on the liquid on the opposite side of the permeable body.

4. A flow control device comprising means to produce a vacuum incident to the flow of a liquid, a reservoir adapted to contain a liquid to be added to said first mentioned liquid, an upstanding hollow permeable body in said reservoir, said capillary pores being fillable with said additive liquid by capillary action to make said body gas impervious, a passage connecting the interior of the permeable body to the vacuum producing means and means to regulate the height of liquid in said reservoir to control the rate of flow of liquid from the reservoir through the permeable body.

5. A flow control device comprising means to produce a vacuum incident to the flow of a liquid, an airtight reservoir adapted to contain a liquid to be added to said first mentioned liquid, means to supply a liquid to the reservoir, an upstanding hollow permeable body in said reservoir, said body having capillary pores fillable with the liquid in said reservoir by capillary action to make said body impervious to the passage of gas, a passage connecting the interior of the permeable body to the vacuum producing means, valve means adapted to connect the upper portion of the reservoir to the atmosphere to lower the liquid level in the reservoir and valve means to connect the upper portion of the reservoir to the vacuum produced by the vacuum producing means to raise the liquid level in the reservoir.

6. A flow control device comprising a body containing a diaphragm and having a discharge chamber on one side of said diaphragm, a discharge passage leading from said chamber, said diaphragm being movable to control flow through said passage, a supply chamber on the side of said diaphragm opposite the discharge chamber, means connecting said chambers including a reservoir adapted to contain a liquid, an upstanding hollow permeable body in said reservoir, said body having capillary pores fillable with the liquid in said reservoir by capillary action to make said body impervious to the passage of gas, a passage connecting the reservoir to the supply chamber and a passage connecting the interior of the permeable body to the discharge chamber, means to flow fluid through said supply chamber and said connecting means to the discharge chamber and means to bias the diaphragm to block the passage between the supply chamber and the reservoir when said means to flow fluid is not operating.

7. A flow control device comprising a body containing a diaphragm and having a discharge chamber on one side of said diaphragm, a discharge passage leading from said chamber, said diaphragm being movable to control flow through said passage, a supply chamber on the side of said diaphragm opposite the discharge chamber, means connecting said chamber including a reservoir adapted to contain a liquid, an upstanding hollow permeable body in said reservoir, said body having capillary pores fillable with the liquid in said reservoir by capillary action to make said body impervious to the passage of gas, a passage connecting the reservoir to the supply chamber and a passage connecting the interior of the permeable body to the discharge chamber, means to flow fluid through said supply chamber and said connecting means to the discharge chamber and means to bias the diaphragm to block the passage between the supply chamber and the reservoir when said means to flow fluid is not operating and means to regulate the height of liquid in said reservoir to control the rate of flow of liquid from the reservoir.

8. A flow control device comprising a body containing a diaphragm and having a discharge chamber on one side of said diaphragm, a discharge passage leading from said chamber, said diaphragm being movable to control flow through said passage, a supply chamber on the side of said diaphragm opposite the discharge chamber, a supply passage leading to said supply chamber, means connecting said chambers including a second passage communicating with said supply chamber, means to flow fluid through said supply chamber and said connecting means to the discharge chamber and means to bias the diaphragm to block said second passage communicating with the supply chamber when the means to flow fluid is not operating.

9. A flow control device comprising an ejector, a body containing a diaphragm and having a discharge chamber on one side of said diaphragm, means including a passage connecting the ejector and said chamber, said diaphragm being movable to control flow through said passage, a supply chamber on the side of said diaphragm opposite the discharge chamber, means to supply fluid to said supply chamber, means connecting said chambers including a passage communicating with said supply chamber, means to bias the diaphragm to block said passage communicating with the supply chamber when the ejector is not operating to prevent back flow of liquid.

References Cited in the file of this patent

UNITED STATES PATENTS

| | | |
|---|---|---|
| 1,435,883 | Spohn | Nov. 14, 1922 |
| 1,927,636 | Gary | Sept. 19, 1933 |
| 2,103,118 | Petroe | Dec. 21, 1937 |
| 2,515,394 | Clarkson | July 18, 1950 |
| 2,610,645 | Wagner | Sept. 16, 1952 |
| 2,612,403 | Burch | Sept. 30, 1952 |
| 2,620,234 | Schaich | Dec. 2, 1952 |
| 2,811,389 | Fischer | Oct. 29, 1957 |
| 2,887,129 | Stear | May 19, 1959 |
| 2,938,538 | Allen | May 31, 1960 |